(12) United States Patent
Pang

(10) Patent No.: US 7,621,358 B2
(45) Date of Patent: Nov. 24, 2009

(54) INFLATABLE ELECTRIC VEHICLE

(76) Inventor: Yi Pang, 9710 Traville Gateway Dr., Suite 116, Rockville, MD (US) 20850

( * ) Notice: Subject to any disclaimer, the term of this patent is extended or adjusted under 35 U.S.C. 154(b) by 45 days.

(21) Appl. No.: 12/032,679

(22) Filed: Feb. 17, 2008

(65) Prior Publication Data
US 2009/0205893 A1    Aug. 20, 2009

(51) Int. Cl.
*B62D 39/00* (2006.01)

(52) U.S. Cl. .................. 180/65.1; 180/216; 180/208; 296/181.7

(58) Field of Classification Search ............. 180/65.1, 180/65.5, 127; 296/181.7; 280/287, 281.1, 280/288.3
See application file for complete search history.

(56) References Cited

U.S. PATENT DOCUMENTS

| | | | | |
|---|---|---|---|---|
| 4,126,312 A | | 11/1978 | Kreuzer et al. | |
| 4,821,829 A | * | 4/1989 | Gilbert et al. | 180/127 |
| 5,512,002 A | * | 4/1996 | Lieberman | 446/221 |
| 6,659,837 B1 | * | 12/2003 | Lieberman | 446/220 |
| 7,188,694 B1 | * | 3/2007 | Blair | 180/218 |
| 7,214,119 B2 | * | 5/2007 | Lucas et al. | 446/465 |
| 7,278,507 B2 | | 10/2007 | Walworth | |
| 2005/0268833 A1 | * | 12/2005 | Conrad | 114/55.5 |
| 2007/0051548 A1 | | 3/2007 | Kosco et al. | |
| 2007/0125285 A1 | * | 6/2007 | Conrad | 114/55.5 |
| 2008/0153382 A1 | * | 6/2008 | Borg et al. | 446/220 |
| 2009/0043438 A1 | * | 2/2009 | Redmond | 701/22 |

* cited by examiner

*Primary Examiner*—Jeffrey J Restifo
(74) *Attorney, Agent, or Firm*—Louis Ventre, Jr.

(57) ABSTRACT

An electric vehicle for personal transportation has an inflatable body that can be deflated and the electric vehicle collapsed to a storage or transport configuration that is compact and light-weight. At least one front wheel and one rear wheel are attached to the inflatable body. An electric motor is attached to a wheel and preferably there is an electric motor for each rear wheel to power and brake the vehicle. A battery pack provides vehicle propulsion and provides structural support. An electronic control unit controls the electric motor and also provides structural support. A steering assembly includes the front wheel that is structurally connected to a rear wheel by the inflatable body, a steering column, handle bars, and braking and speed controls operable by a person sitting on the inflatable body.

12 Claims, 4 Drawing Sheets

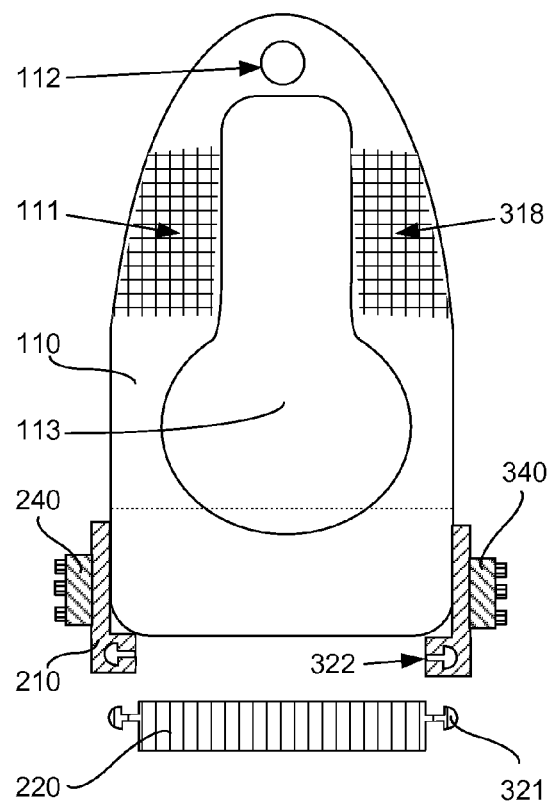
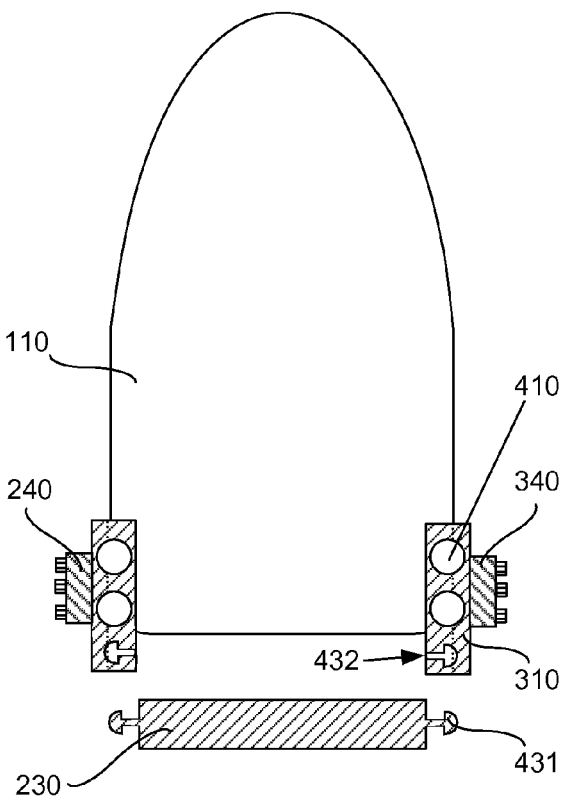
FIG.3
FIG.4
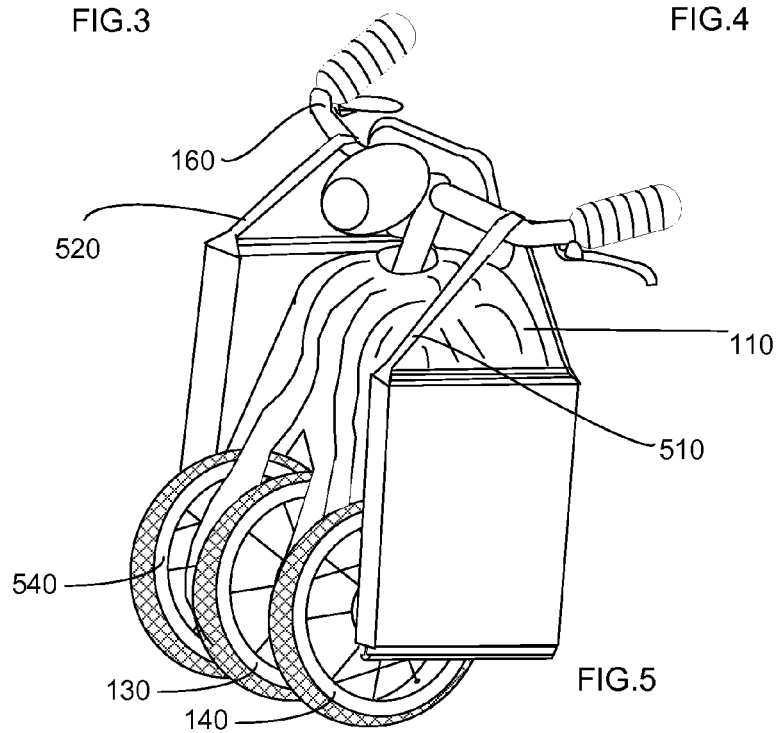
FIG.5

INFLATABLE ELECTRIC VEHICLE

FIELD OF INVENTION

In the field of motor vehicles, an electric vehicle for personal transportation preferably has three wheels and an inflatable body that may be deflated and the vehicle collapsed to a storage or transport configuration that is compact and light-weight.

DESCRIPTION OF PRIOR ART

One aspect of the prior art in this category relates to collapsible frame vehicles. The present invention is distinct from this category in that it eliminates the metal or rigid structural frame between the front and rear and accompanying pivot points enabling the collapsible concept.

An example is United States Patent Application 20070051548A1 which discloses a two-wheeled collapsible powered vehicle with a rear frame assembly and a front frame assembly that are pivotally attached to one another. The frame can be pivoted from a normal fully-extended operating position to a folded position.

A second example involving a four-wheeled vehicle is U.S. Pat. No. 7,278,507 for a collapsible personal transportation vehicle designed to be compacted and stowed, for example, in a mobile home. Here again various rigid structural pivoting members are used as part of the collapsible assembly.

Another aspect of the prior art involves the use of an inflatable body for a three-wheeled vehicle, although not intended for an operational vehicle for personal transportation.

An example of this prior art is U.S. Pat. No. 4,126,312 for a mobile weapons surface target. Use of a battery-driven electric motor is disclosed with a rigid structural chassis linking the front and rear of the vehicle. The pliable cover preferably is plastic and inflatable in individual sections, which may be filled with "smoke" for recognition of a hit. The vehicle is radio-controlled. The present invention is physically different in numerous distinctive and innovative aspects, for example, it eliminates a rigid structural frame between the front and rear, the vehicle is operable as a personal vehicle by a person sitting on the vehicle and the battery pack and electronic control unit structurally join the rear wheels.

Accordingly, the present invention will serve to improve the state of the art by providing an electric vehicle for personal transportation. The electric vehicle has an inflatable body that eliminates a rigid structural frame and pivot points between the front and rear of the vehicle. The inflatable body may be deflated and the vehicle collapsed to a storage or transport configuration that is compact and light-weight.

BRIEF SUMMARY OF THE INVENTION

An electric vehicle for personal transportation with an inflatable body may be deflated and the electric vehicle collapsed to a storage or transport configuration that is compact and light-weight. The electric vehicle is preferably a three-wheeled vehicle, but may have any number of wheels. The inflatable body is preferably made of carbon fiber sheet, KEVLAR, or soft glass fiber sheet and has a foot rest on each side and a seating area. For a three-wheeled vehicle, two rear wheels are attached to the inflatable body preferably by attachment to two support plates located near the rear and on each side of inflatable body. An electric motor is attached to a rear wheel and preferably there is an electric motor for each rear wheel. The electric motor preferably provides braking force when needed and may also regenerate electricity from braking. A battery pack provides vehicle propulsion and provides structural support. An electronic control unit is powered by the battery pack, controls the electric motor and also provides structural support. A steering assembly includes a front wheel structurally connected to a rear wheel by the inflatable body, a steering column, handle bars, and braking and speed controls operably connected to the electric motors through the electronic control unit. The steering column preferably rises from the front wheel through a columnar passage through the inflatable body. A valve is used for deflating the inflatable body to a collapsed state wherein the wheels are approximately aligned at the front after the battery pack and electronic control unit are removed from their attachment to and connection between the support plates. In the deflated configuration, the collapsed three-wheeled vehicle can fit into a rectangular box defined approximately by the width and depth of the handle bars and the height of the steering assembly.

BRIEF DESCRIPTION OF THE DRAWINGS

The drawings represent preferred embodiments of the electric vehicle in accordance with the invention. The reference numbers in the drawings are used consistently throughout. New reference numbers in FIG. 2 are given the 200 series, new reference numbers and in FIG. 3 are given 300 series numbers, new reference numbers in FIG. 4 are given 400 series numbers, and new reference numbers in FIG. 5 are given 500 series numbers.

FIG. 3 is a top view of the inflatable body with the battery pack at the rear of the inflatable body.

FIG. 4 is a rear view of the inflatable body with an electronic control unit beneath the inflatable body.

FIG. 5 is a perspective of an electric vehicle with the inflatable body in a deflated configuration.

DETAILED DESCRIPTION

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural and operational changes may be made without departing from the scope of the present invention.

Figure 1:
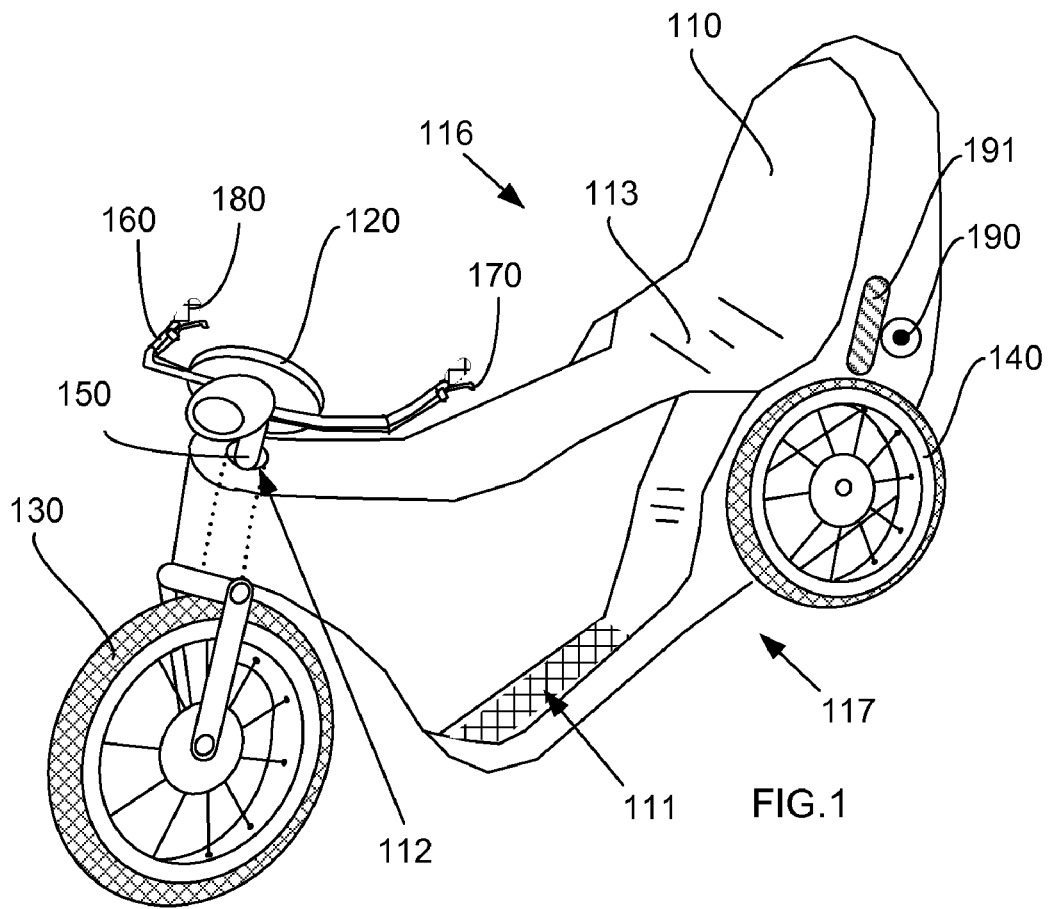
FIG. 1 is a perspective of a preferred embodiment of the electric vehicle.

FIG. 1 shows a perspective of a preferred embodiment of the electric vehicle for personal transportation including but not limited to six elements. A first element is an inflatable body (110). Preferably, the inflatable body is made of durable air-tight material commonly available, examples of which are carbon fiber sheet, KEVLAR, and soft glass fiber sheet.

Figure 2:
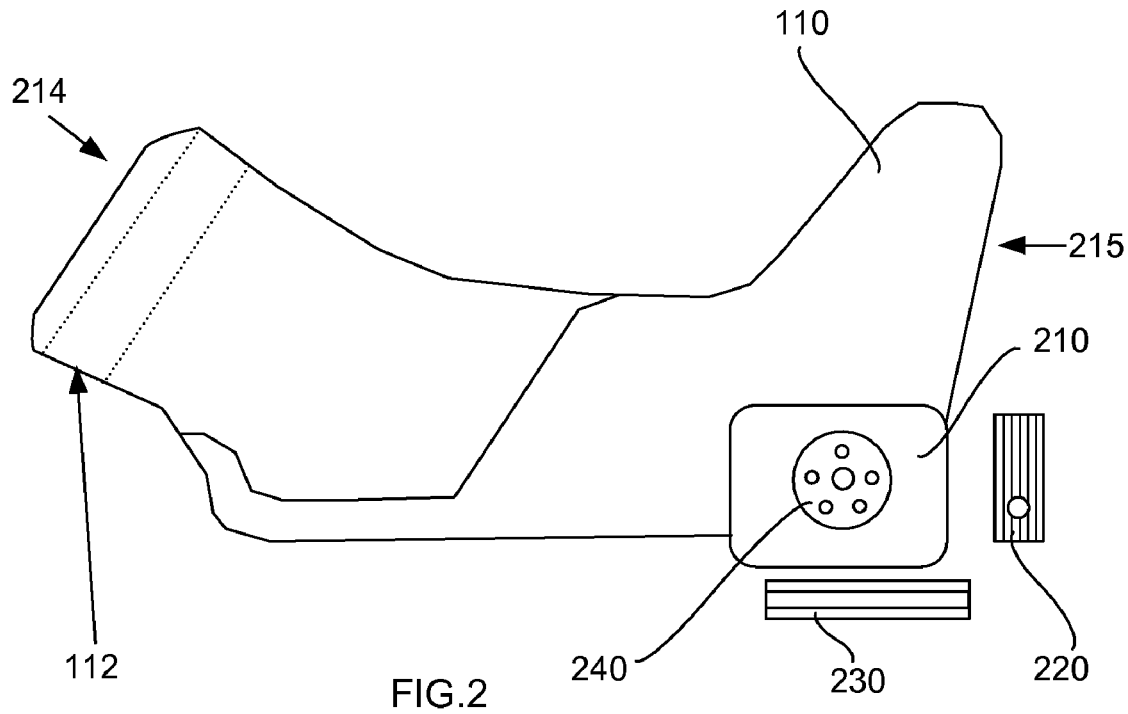
FIG. 2 is a side view of an inflatable body with a support plate, electric motor, battery pack and electronic control unit.

FIG. 2 shows a left-side elevation view of this inflatable body (110), which includes a front (214), a rear (215), two sides, namely a left side (117) as shown in FIG. 1 and a right side (116) as shown in FIG. 1. Optionally, the inflatable body (110) has a foot rest on each side, namely, a left-side foot rest (111) as shown in FIG. 1 and a right side foot rest (318) as shown in FIG. 3 and, a seating area (113). Preferably, the inflatable body (110) has a columnar passage (112) at its front (214) to encircle a steering column (150).

FIG. 3 shows a top view of this inflatable body (110), which has two support plates (210) and (310), each attached on a side of the inflatable body approximately at the rear (215). The support plates are preferably metal but may be plastic, carbon fiber, KEVLAR or any other structural material capable of supporting the loads involved.

A second element of the preferred embodiment is two rear wheels (one is shown in FIG. 1 at (140) and the other on the opposite side of the inflatable body (110) is shown in FIG. 5 at (540). Both rear wheels are attached to the inflatable body (110).

A third element of the preferred embodiment is an electric motor (240) attached to a rear wheel (140). This embodiment also has a second electric motor (340) attached to the other rear wheel (540), although this second motor (340) is optional. Each electric motor (240) or (340) is operable to power a rear wheel of the vehicle and provide braking force. The braking force is preferably provided by regenerative braking through the motor, which is well known in the art and which generates electricity from braking that is stored in the battery pack. The electric motor (240), as used herein, may include gearing commonly found in such applications.

Each support plate (210) or (310) serves as a preferred means to attach an electric motor (240) and (340) and a rear wheel (140) and (540) to the inflatable body (110).

A fourth element is a battery pack (220) that structurally joins the two rear wheels (140) and (540). Preferably, the battery pack (220) structurally joins the two rear wheels (140) and (540) by removably attaching to, and connecting between, the support plates (210) and (310). As shown in FIG. 3, a removable attachment comprising a nub (321) at each lateral end of the battery pack (220) and corresponding mating slot (322) on the top of the two support plates (210) and (310) provide a simple drop in attachment that structurally joins the two rear wheels (140) and (540) via the two metal plates (210) and (310) at the back end of the inflatable body (110).

A fifth element is an electronic control unit (230) powered by the battery pack (220) that structurally joins the two rear wheels (140) and (540) and controls the electric motor (240). When there is a second electric motor (340), or more than one motor, the electronic control unit (230) controls these motors. As shown in FIG. 4, a removable attachment comprising a nub (431) at each lateral end of the electronic control unit (230) and corresponding mating slot (432) on the bottom end of the two support plates (210) and (310) provide a simple slide in attachment that structurally joins the two rear wheels (140) and (540) via the two metal plates (210) and (310) underneath the inflatable body (110).

The joining of the two metal plates (210) and (310) by the battery pack (220) and the electronic control unit (230) structurally joins the two rear wheels (140) and (540) via the two metal plates (210) and (310) in a sturdy L-shaped configuration.

A sixth element is a steering assembly comprising a front wheel (130) that is structurally connected to the rear wheels (140) and (540) by the inflatable body (110), steering column (150), handle bars (160), braking controls (170) and speed controls (180) operable by a person sitting on the inflatable body (110) and operably connected to the electric motor (240) or electric motors (240 and 340) through the electronic control unit (230). The steering column (150) preferably rises from the front wheel (130) in the columnar passage (112) through the inflatable body (110). Preferably, the speed and braking controls parallel those commonly found on a motorcycle, such as for example, throttling by twisting a hand grip, and braking by pulling a hand lever.

A preferred embodiment of the electric vehicle includes a valve (190) and an air pump (191) for inflating the inflatable body (110) and for deflating the inflatable body (110) to a collapsed state as shown in FIG. 5. The air pump (191) is preferably powered by the battery pack (220) and may either be built-in to the inflatable body (110) or be an external attachment to the electric vehicle.

In the collapsed state, the front wheel (130) and the two rear wheels (140) and (540) are approximately aligned at the front (214) after the battery pack (220) and electronic control unit (230) are removed from their attachment to and connection between the support plates (210) and (310). In the collapsed state shown in FIG. 5, it can be seen that the electric vehicle can fit into a rectangular box defined approximately by the width and depth of the handle bars (160) and the height of the steering assembly.

Optionally, an embodiment of the electric vehicle includes a strap (520) attachable to the battery pack (220); and, a strap (510) attachable to the electronic control unit (230).

In other embodiments with differing numbers of wheels, the principles, or basic elements, of the invention remain the same. A first principle is that the electric vehicle is for personal transportation.

A second principle is that the electric vehicle has an inflatable body comprising a front, a rear, two sides, a seating area.

A third principle is that there are at least two wheels connected to the inflatable body wherein at least one wheel is connected to the front and at least one wheel is connected to the rear of the inflatable body. In all cases, the inflatable body forms the only structural support or connection between any front wheel and any rear wheel of the vehicle.

A fourth principle is that the electric vehicle has an electric motor attached to a wheel. The motor may be connected to any wheel, or there may be a motor connected to each wheel.

A fifth principle is that the electric vehicle has a battery pack to power the vehicle.

A sixth principle is that the electric vehicle has an electronic control unit powered by the battery pack that provides added structural support to the vehicle and controls the electric motor.

And finally, a seventh principle is that the electric vehicle has a steering assembly comprising a front wheel, steering column connected to the front wheel through a columnar passage through the inflatable body, a steering mechanism, and braking and speed controls operable by a person sitting on the inflatable body, wherein such speed controls are connected to the electric motor through the electronic control unit. The steering column connection to the front wheel may be direct or indirect, that is for example, it may include a traditional rack and pinion connection to two wheels or any other suitable steering connection. The braking and speed controls may be hand operated on handle bars or a circular steering wheel may be used and other hand or foot operable controls may be used. The person may be sitting on the inflatable body out in the open or the inflatable body may have an enclosure over the person.

Figure 6:
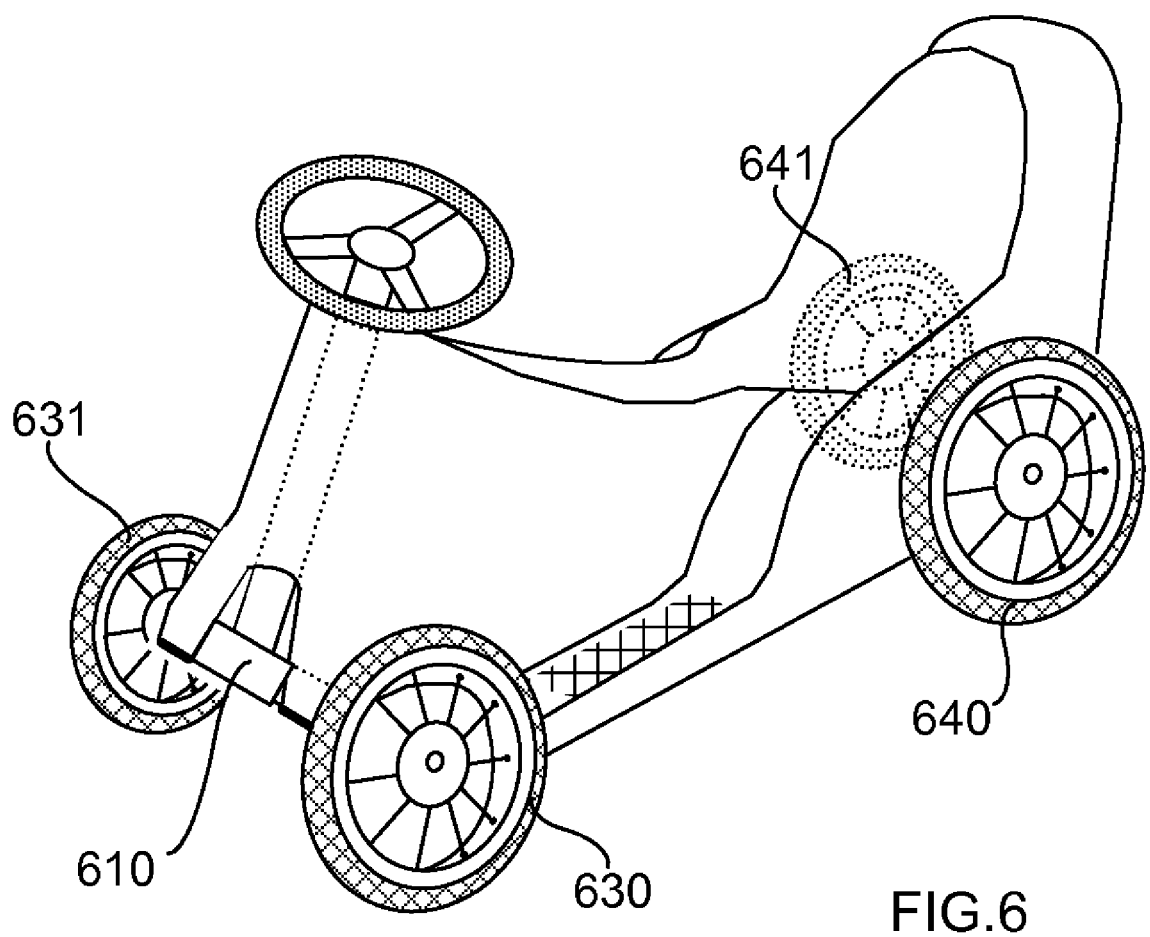
FIG. 6 is a perspective of a four-wheeled embodiment of the invention.

FIG. 6 is a perspective of a four-wheeled embodiment of the invention incorporating the above principles. In this embodiment, two wheels are connected to the front, namely a right-side front wheel (631) and a left-side front wheel (630); and two wheels are connected to the rear, namely a right-side rear wheel (641) shown in dotted lines and a left-side rear wheel (640). This embodiment includes a rack and pinion steering mechanism (610) that is well known in the prior art.

Figure 7:
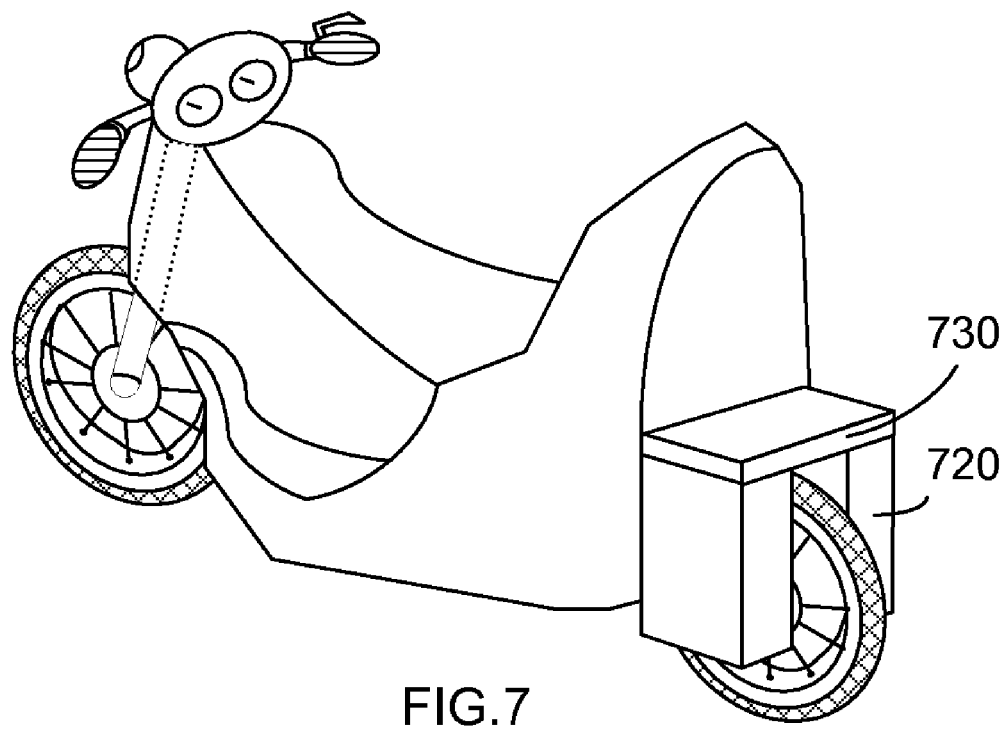
FIG. 7 is a perspective of a two-wheeled embodiment of the invention.
Figure 8:
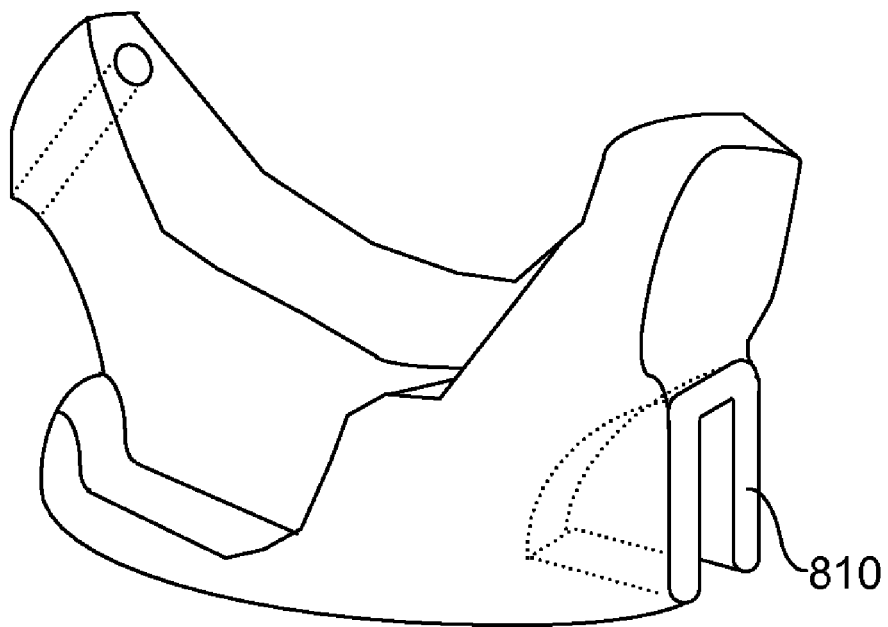
FIG. 8 is a perspective of an inflatable body for the two wheeled embodiment.

FIG. 7 is a perspective of a two-wheeled embodiment of the invention incorporating the above principles. The electronic control unit (730) and the battery pack (720) are mounted on the rear of inflatable body. FIG. 8 shows an inflatable body for this embodiment where a U-shaped bracket (810) at the end of a wheel well is used as the means for attaching the battery pack (720) and electronic control unit (730).

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

What is claimed is:

1. An electric vehicle for personal transportation comprising:
    (a) an inflatable body;
    (b) two rear wheels;
    (c) an electric motor attached to a rear wheel;
    (d) two support plates wherein each support plate is configured to attach a rear wheel to the inflatable body.
    (e) a battery pack configured to be removably attached between the two support plates to structurally join the two rear wheels, and further configured such that removal of the battery pack from between the support plates is required for the vehicle to form into a collapsed state;
    (f) an electronic control unit powered by the battery pack that controls the electric motor; and,
    (g) a steering assembly comprising a front wheel structurally connected to the rear wheels by the inflatable body, steering column, handle bars, and braking and speed controls operable by a person sitting on the inflatable body, wherein such speed controls are connected to the electric motor through the electronic control unit.

2. The electric vehicle of claim 1 wherein the steering column rises from the front wheel in a columnar passage through the inflatable body.

3. The electric vehicle of claim 1 wherein the inflatable body is made of material selected from a group consisting of carbon fiber sheet, KEVLAR, and soft glass fiber sheet.

4. The electric vehicle of claim 1 further comprising a second electric motor attached to the other rear wheel.

5. The electric vehicle of claim 1 wherein the electric motor is operable to power a rear wheel of the vehicle and to provide braking force.

6. The electric vehicle of claim 1 wherein the inflatable body comprises a front, a rear, two sides and two support plates each support plate attached approximately at the rear and on a side of inflatable body and wherein each support plate serve as a means to attach a rear wheel to the inflatable body.

7. The electric vehicle of claim 6 wherein the inflatable body further comprises a foot rest on each side; and, a seating area.

8. The electric vehicle of claim 6 wherein the battery pack and electronic control unit join the two rear wheels by removably attaching to, and connecting between, the support plates.

9. The electric vehicle of claim 8 further comprising a valve for inflating the inflatable body and deflating the inflatable body to a collapsed state wherein when the inflatable body is deflated, the wheels are approximately aligned at the front after the battery pack and electronic control unit are removed from their attachment to and connection between the support plates and the electric vehicle can fit into a rectangular box defined approximately by the width and depth of the handle bars and the height of the steering assembly.

10. The electric vehicle of claim 9 further comprising a strap attachable to the battery pack; a strap attachable to the electronic control unit; and an air pump to inflate or deflate the inflatable body.

11. An electric vehicle for personal transportation comprising:
    (a) an inflatable body comprising a front, a rear, two sides, a seating area;
    (b) a plurality of wheels connected to the inflatable body wherein a wheel is connected to the front and a wheel is connected to the rear of the inflatable body and wherein the inflatable body forms the only structural connection between the front wheel and the rear wheel of the vehicle;
    (c) an electric motor attached to a wheel;
    (d) a battery pack;
    (e) an electronic control unit powered by the battery pack that controls the electric motor and,
    (f) a steering assembly comprising a front wheel, steering column connected to the front wheel through a columnar passage through the inflatable body, a steering mechanism, and braking and speed controls operable by a person sitting on the inflatable body, wherein such speed controls are connected to the electric motor through the electronic control unit;
    wherein the battery pack and the electronic control unit are mounted on the rear of the inflatable body; and,
    wherein the mounting of the battery pack and the electronic control unit are configured to support a rear wheel.

12. The electric vehicle of claim 11 wherein the plurality of wheels comprises two wheels connected to the front and two rear wheels connected to the rear.

* * * * *